(12) United States Patent
Ohnuma et al.

(10) Patent No.: US 8,320,745 B2
(45) Date of Patent: Nov. 27, 2012

(54) RECORDING APPARATUS, RECORDING METHOD, AND PROGRAM

(75) Inventors: Kensuke Ohnuma, Tokyo (JP); Hideki Asazu, Tokyo (JP); Takehisa Souraku, Kanagawa (JP); Yuji Murakami, Tokyo (JP)

(73) Assignee: Sony Corporation, Tokyo (JP)

( * ) Notice: Subject to any disclaimer, the term of this patent is extended or adjusted under 35 U.S.C. 154(b) by 1445 days.

(21) Appl. No.: 11/517,616

(22) Filed: Sep. 7, 2006

(65) Prior Publication Data

US 2007/0058931 A1    Mar. 15, 2007

(30) Foreign Application Priority Data

Sep. 8, 2005   (JP) ................................. 2005-260530

(51) Int. Cl.
  *H04N 5/76*    (2006.01)
  *H04N 9/80*    (2006.01)
  *H04N 5/445*   (2011.01)
  *G06F 3/00*    (2006.01)
  *G06F 13/00*   (2006.01)

(52) U.S. Cl. ............. 386/291; 386/248; 725/38; 725/50

(58) Field of Classification Search ................ 386/1, 46, 386/52–55, 111, 112, 121, 125–126, 83, 386/95, 291–299, 239–248; 725/37, 38, 725/39, 50, 53, 58
See application file for complete search history.

(56) References Cited

U.S. PATENT DOCUMENTS

| | | | | |
|---|---|---|---|---|
| 6,489,999 | B1 * | 12/2002 | Okabe | 348/460 |
| 7,006,881 | B1 * | 2/2006 | Hoffberg et al. | 700/83 |
| 7,366,461 | B1 * | 4/2008 | Brown | 455/3.06 |
| 2003/0016944 | A1 * | 1/2003 | Kato | 386/46 |
| 2004/0103434 | A1 * | 5/2004 | Ellis | 725/58 |
| 2006/0029369 | A1 * | 2/2006 | Ohde et al. | 386/83 |
| 2006/0204214 | A1 * | 9/2006 | Shah et al. | 386/54 |

FOREIGN PATENT DOCUMENTS

| | | |
|---|---|---|
| JP | 6 62357 | 3/1994 |
| JP | 10 93936 | 4/1998 |
| JP | 2003 32598 | 1/2003 |
| JP | 2004 7757 | 1/2004 |
| JP | 2005 65052 | 3/2005 |
| JP | 2005 102059 | 4/2005 |

* cited by examiner

*Primary Examiner* — Thai Tran
*Assistant Examiner* — Hung Dang
(74) *Attorney, Agent, or Firm* — Frommer Lawrence & Haug LLP; William S. Frommer; Thomas F. Presson

(57) ABSTRACT

A recording apparatus is disclosed which records at least either a video or an audio signal of a broadcast program in accordance with reservation information. The recording apparatus includes: an acquisition block configured to acquire program information about the broadcast program; a calculation block configured to calculate a degree of similarity between a program name included in the reservation information and the program name described in the program information acquired by the acquisition block; a changing block configured to change the reservation information using the program information about the broadcast program determined by the degree of similarity, the changing block further changing the reservation information based on the program information about the broadcast program corresponding to program identification information included in the reservation information; and a recording control block configured to record at least either the video or the audio signal of the broadcast program in accordance with the reservation information.

4 Claims, 9 Drawing Sheets

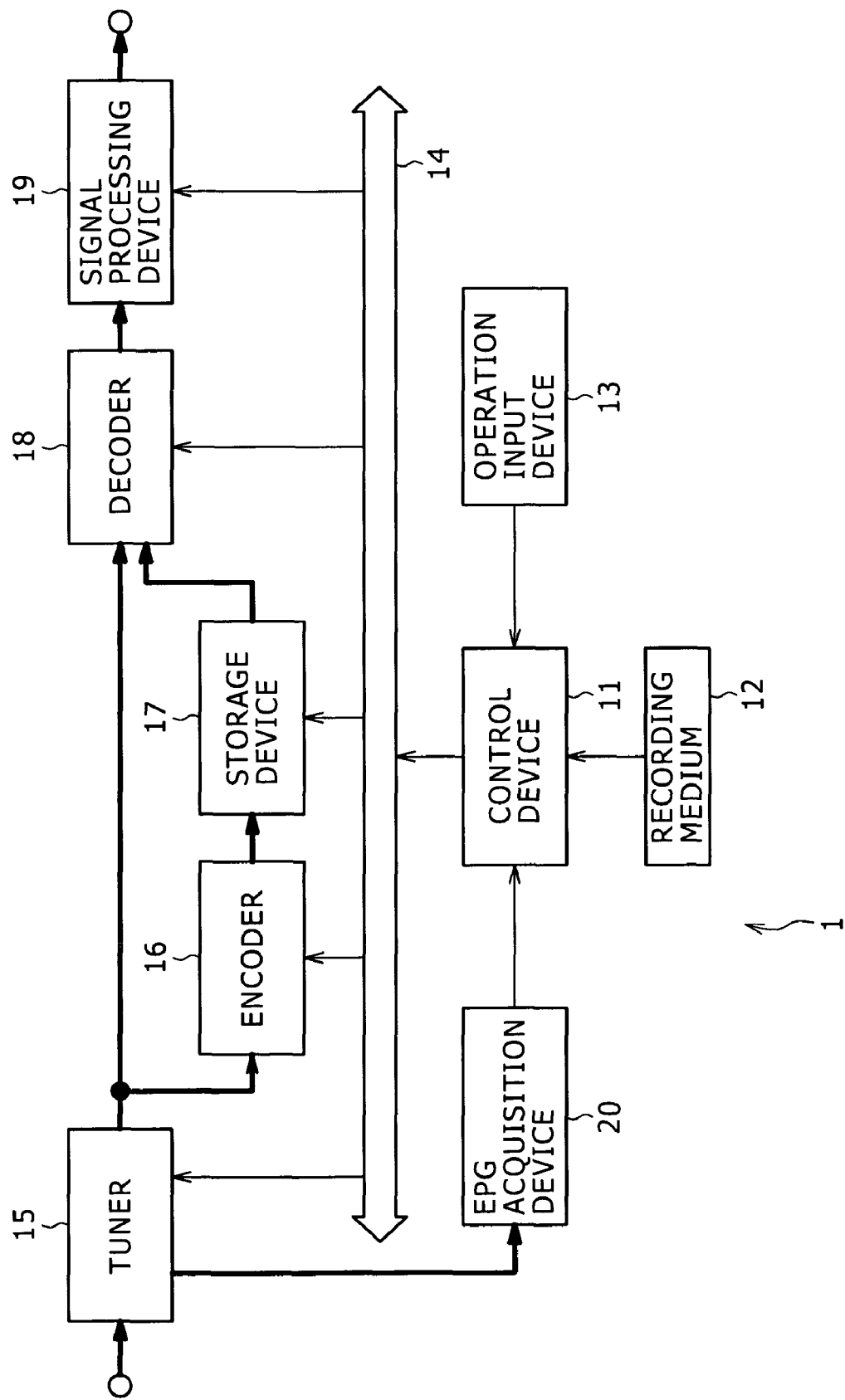

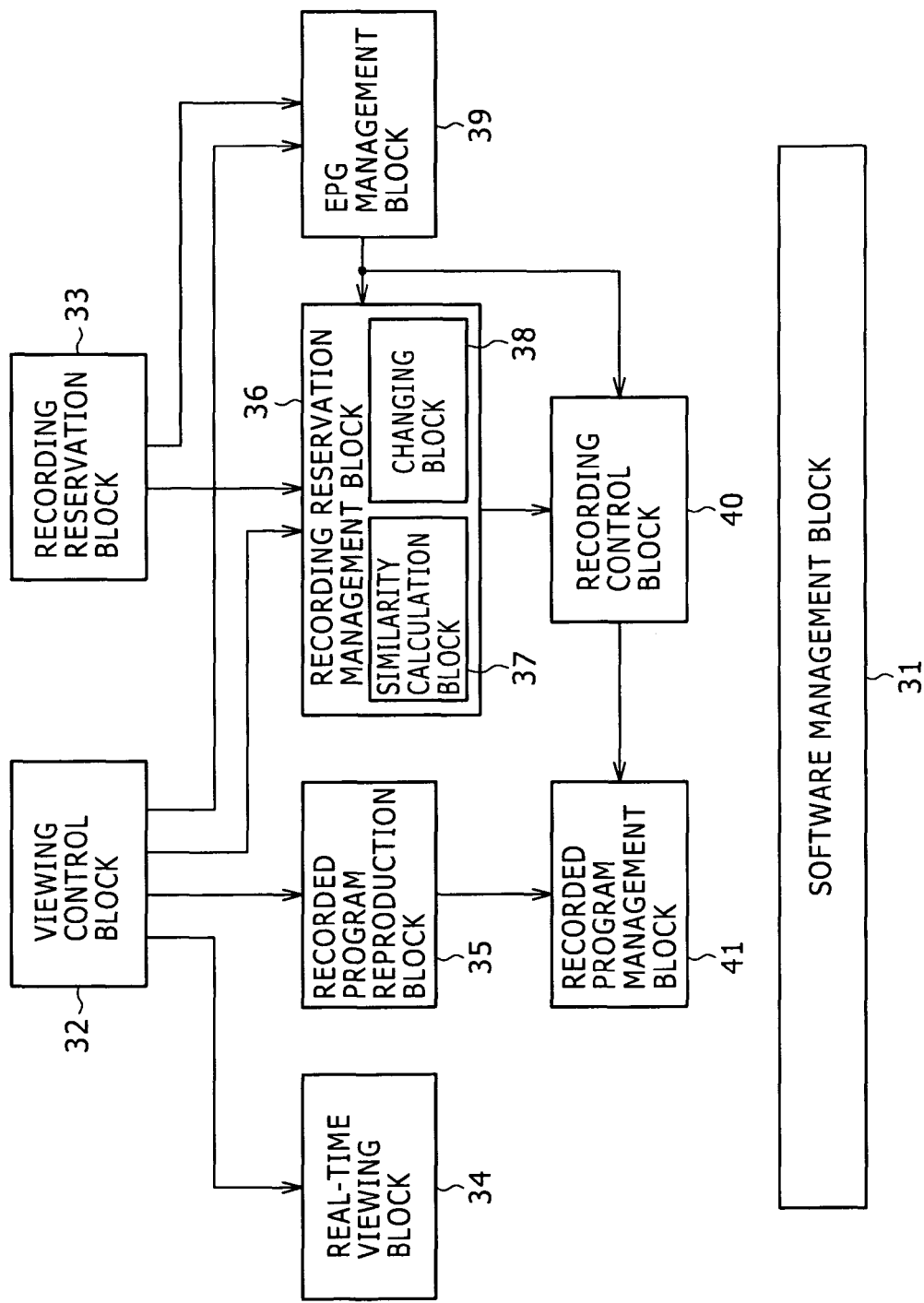

FIG. 4

| | RESERVATION INFORMATION | EXAMPLE |
|---|---|---|
| 101 | RESERVATION INFORMATION ID | 987XYZ |
| 102 | TRACK SETTING FLAG | ON/OFF |
| 103 | STARTING DATE AND TIME | 11/20/2005 13:00:00 |
| 104 | ENDING DATE AND TIME | 11/20/2005 14:00:00 |
| 105 | ENDING TIME PROLONGATION | 30 MIN. |
| 106 | REPEAT RECORDING INFORMATION | EVERY DAY |
| 107 | CHANNEL INFORMATION | DIGITAL TERRESTRIAL BROADCAST ON CHANNEL 11 |
| 108 | RECORDING MEDIA | HDD, DVD, ETC. |
| 109 | PRIORITY | 10 |
| 110 | DELETE-UPON UPDATE FLAG | ON/OFF |
| 111 | RECORDING MODE | HIGH/MEDIUM/LOW QUALITY, ETC. |
| 112 | RESERVATION TYPE | PROGRAM RESERVATION (WITH EVENT ID TRACKING)<br>PROGRAM RESERVATION (WITHOUT EVENT ID TRACKING)<br>DATE AND TIME-DESIGNATED RESERVATION<br>OTHER |
| 113 | CORRESPONDING PROGRAM INFORMATION | PROGRAM INFORMATION ID<br>STARTING DATE AND TIME<br>ENDING DATE AND TIME<br>PROGRAM NAME<br>CHANNEL INFORMATION<br>PROGRAM DETAIL INFORMATION<br>GENRE INFORMATION<br>EXTENDED PROGRAM DETAIL INFORMATION<br>EVENT ID<br>EVENT RELAY EXECUTION INFORMATION<br>EVENT RELAY DESTINATION INFORMATION<br>OTHER PROGRAM INFORMATION |
| 114 | PROGRAM NAME TRACKING FLAG | ON/OFF |
| 115 | PROGRAM NAME TRACKING KEYWORD | BASEBALL |
| 116 | INITIALLY SET RESERVATION INFORMATION | STARTING DATE AND TIME<br>ENDING DATE AND TIME<br>DETAIL INFORMATION<br>GENRE INFORMATION<br>IMAGE QUALITY |

FIG. 5

| | PROGRAM INFORMATION | EXAMPLE |
|---|---|---|
| 151 | PROGRAM INFORATION ID | ABC123 |
| 152 | STARTING DATE AND TIME | 11/20/2005 13:00:00 |
| 153 | ENDING DATE AND TIME (OR PROGRAM LENGTH) | 11/20/2005 14:00:00 |
| 154 | PROGRAM NAME | SEMIFINALS OF INTER-HIGH SCHOOL BASEBALL TOURNAMENT |
| 155 | CHANNEL INFORMATION | DIGITAL TERRESTRIAL BROADCAST ON CHANNEL 11 |
| 156 | GENRE INFORMATION | NEWS |
| 157 | PROGRAM DETAIL INFORMATION | TOKYO HIGH SCHOOL VS. HOKKAIDO HIGH SCHOOL |
| 158 | EXTENDED PROGRAM DETAIL INFORMATION | COMMENTATOR : TARO YAMADA ANNOUNCER : JIRO SATO |
| 159 | EVENT ID | 0x03a9 |
| 160 | EVENT RELAY EXECUTION FLAG | ON/OFF |
| 161 | EVENT RELAY DESTINATION INFORMATION | CHANNEL : DIGITAL TERRESTRIAL BROADCAST ON CHANNEL 21; EVENT ID : 0x02b1 |
| 162 | OTHER PROGRAM INFORMATION | SHARED EVENT INFORMATION MULTI-VIEW INFORMATION IMAGE QUALITY CHARGING INFORMATION AUDIENCE AGE INFORMATION SERIES INFORMATION ES INFORMATION COPY CONTROL INFORMATION OTHER |

RECORDING APPARATUS, RECORDING METHOD, AND PROGRAM

CROSS REFERENCES TO RELATED APPLICATIONS

The present invention contains subject matter related to Japanese Patent Application JP 2005-260530 filed with the Japanese Patent Office on Sep. 8, 2005, the entire contents of which being incorporated herein by reference.

BACKGROUND OF THE INVENTION

1. Field of the Invention

The present invention relates to a recording apparatus, a recording method, and a program. More particularly, the invention relates to a recording apparatus, a recording method, and a program for adaptively updating repeat recording reservations of TV programs in keeping with changes in program broadcast times.

2. Description of the Related Art

Among video recorders for recording TV programs, there are many which permit TV programs to be reserved for recording through the use of EPG (electronic program guide) data acquired typically from broadcast signals. One such video recorder is disclosed illustratively in Japanese Patent Laid-open No. 2004-7757.

SUMMARY OF THE INVENTION

There are two kinds of recording reservations: one-shot recording reservations that terminate once the recording is executed, and repeat recording reservations that involve carrying out the recording repeatedly at preset intervals (e.g., at predetermined times every day, every given day of the week, or Monday through Friday).

It sometimes happens that a program reserved for recording is shifted from its scheduled broadcast time illustratively because of a prolongation of a baseball game broadcast or due to an unscheduled news bulletin. There exist techniques that address such eventualities: an extra recording ending time may be set beforehand to anticipate and deal with the possible broadcast prolongation, or the latest EPG data may be acquired to check whether there has been a last-minute change in the broadcast time of a given program, the change being reflected in the recording reservation.

However, these measures are designed to address solely one-shot recording reservations. No techniques or methods have yet been proposed to deal adaptively with unexpected changes in the broadcast times of repeat recording reservations.

The present invention has been made in view of the above circumstances and provides arrangements that adaptively address sudden changes in the broadcast times of repeat recording reservations.

In carrying out the present invention and according to one embodiment thereof, there is provided a recording apparatus for recording at least either a video or an audio signal of a broadcast program in accordance with reservation information, the recording apparatus including: an acquisition block configured to acquire program information about the broadcast program; a calculation block configured to calculate a degree of similarity between a program name included in the reservation information and the program name described in the program information acquired by the acquisition block; a changing block configured to change the reservation information using the program information about the broadcast program determined by the degree of similarity, the changing block further changing the reservation information based on the program information about the broadcast program corresponding to program identification information included in the reservation information; and a recording control block configured to record at least either the video or the audio signal of the broadcast program in accordance with the reservation information.

Preferably, while recording is in progress in accordance with the reservation information, the recording control block may compare the program identification information included in the reservation information with the program identification information about the currently broadcast program, the recording control block further stopping temporarily, resuming, or terminating the ongoing recording depending on an outcome of the comparison.

Preferably, the changing block may update the reservation information at predetermined time intervals.

According to another embodiment of the present invention, there is provided a recording method for use with a recording apparatus which records at least either a video or an audio signal of a broadcast program in accordance with reservation information, the recording method including the steps of: acquiring program information about the broadcast program; calculating a degree of similarity between a program name included in the reservation information and the program name described in the program information acquired by the acquisition block; changing the reservation information using the program information about the broadcast program determined by the degree of similarity, the changing step further changing the reservation information based on the program information about the broadcast program corresponding to program identification information included in the reservation information; and recording at least either the video or the audio signal of the broadcast program in accordance with the reservation information.

According to a further embodiment of the present invention, there is provided a program for causing a computer to carry out a procedure for recording at least either a video or an audio signal of a broadcast program in accordance with reservation information, the procedure including the steps of: acquiring program information about the broadcast program; calculating a degree of similarity between a program name included in the reservation information and the program name described in the program information acquired by the acquisition block; changing the reservation information using the program information about the broadcast program determined by the degree of similarity, the changing step further changing the reservation information based on the program information about the broadcast program corresponding to program identification information included in the reservation information; and recording at least either the video or the audio signal of the broadcast program in accordance with the reservation information.

Where the recording apparatus, recording method, and program according to an embodiment of the present invention are in use, program information about a broadcast program defined by reservation information is first acquired. A degree of similarity is calculated between a program name included in the reservation information and the program name described in the acquired program information. The reservation information is changed using the program information about the broadcast program determined by the degree of similarity, the reservation information being further changed based on the program information about the broadcast program corresponding to program identification information included in the reservation information. Then at least either the video or the audio signal of the broadcast program is recorded in accordance with the reservation information.

According to the present invention, any one of the embodiments outlined above is capable of recording TV programs in accordance with reservation information.

According to the invention, any one of the embodiments is capable of adaptively changing repeat recording reservations in the face of last-minute changes in broadcast times.

Also according to the invention, any one of the embodiments is capable of suitably controlling the recording operation in response to unscheduled program changes during ongoing recording.

BRIEF DESCRIPTION OF THE DRAWINGS

Further objects and advantages of the present invention will become apparent upon a reading of the following description and appended drawings in which:

FIG. 2 is a block diagram showing a typical structure of a video recorder shown in FIG. 1;

FIG. 3 is a block diagram of functional blocks implemented by a control device shown in FIG. 2;

FIG. 4 is a tabular view listing typical reservation information;

FIG. 5 is a tabular view listing typical program information;

DETAILED DESCRIPTION OF THE PREFERRED EMBODIMENTS

Figure 1:
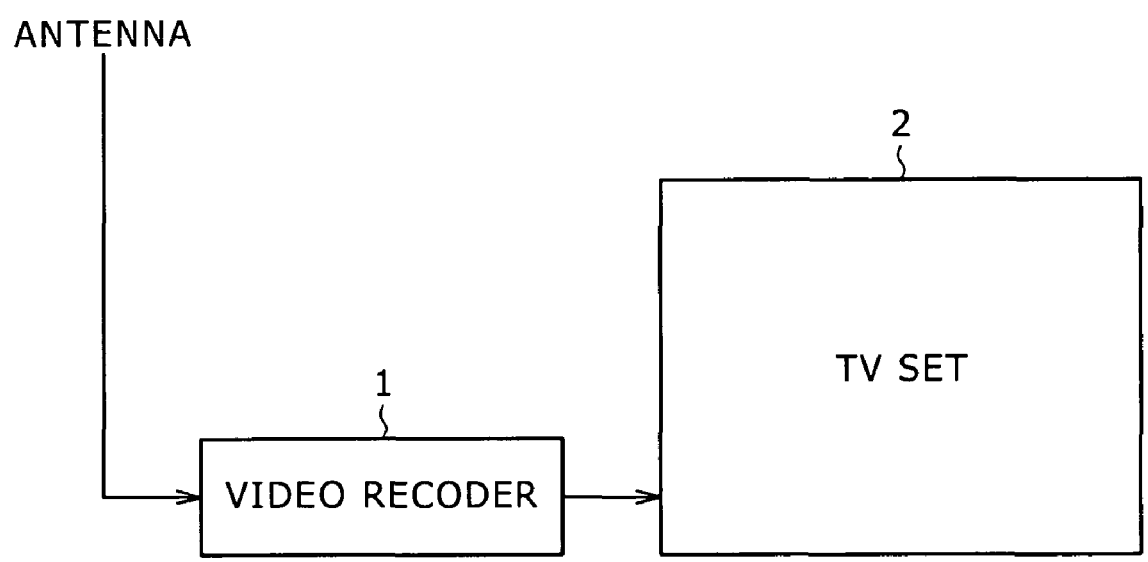
FIG. 1 is a block diagram showing a typical configuration of a TV broadcast reception system according to an embodiment of the present invention.

What is described below as the preferred embodiments of the present invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

One preferred embodiment of the present invention is a recording apparatus (e.g., video recorder 1 in FIG. 1) for recording at least either a video or an audio signal of a broadcast program in accordance with reservation information, the recording apparatus including: an acquisition block (e.g., EPG acquisition device 20 in FIG. 2) configured to acquire program information about the broadcast program; a calculation block (e.g., similarity calculation block 37 in FIG. 3) configured to calculate a degree of similarity between a program name included in the reservation information and the program name described in the program information acquired by the acquisition block; a changing block (e.g., changing block 38 in FIG. 3) configured to change the reservation information using the program information about the broadcast program determined by the degree of similarity, the changing block further changing the reservation information based on the program information about the broadcast program corresponding to program identification information included in the reservation information; and a recording control block (e.g., recording control block 40 in FIG. 3) configured to record at least either the video or the audio signal of the broadcast program in accordance with the reservation information.

Another preferred embodiment of the present invention is a recording method (program) for use with a recording apparatus which records at least either a video or an audio signal of a broadcast program in accordance with reservation information, the recording method including the steps of: acquiring (e.g., in step S4 of FIG. 6) program information about the broadcast program; calculating (e.g., in step S6 of FIG. 6) a degree of similarity between a program name included in the reservation information and the program name described in the program information acquired by the acquisition block; changing (e.g., in step S7 of FIG. 6) the reservation information using the program information about the broadcast program determined by the degree of similarity, the changing step further changing (e.g., in step S34 of FIG. 7) the reservation information based on the program information about the broadcast program corresponding to program identification information included in the reservation information; and recording (e.g., in step S43 of FIG. 8) at least either the video or the audio signal of the broadcast program in accordance with the reservation information.

The preferred embodiments of the present invention will now be described in more detail with reference to the accompanying drawings.

FIG. 1 schematically shows a typical configuration of a TV broadcast reception system including a video recorder practiced as one embodiment of the present invention. The TV broadcast reception system is made up of a video recorder 1 that records and reproduces received TV broadcast signals, and a TV set that displays pictures and outputs sounds based on the output signals coming from the video recorder 1.

FIG. 2 schematically shows a typical structure of the video recorder 1. The video recorder 1 is constituted by a recording device 11 that controls the video recorder 1 as a whole by executing programs recorded on a recording medium 12; an operation input device 13 that accepts the user's operations (e.g., operations for setting recording reservations) and outputs corresponding control signals to the control device 11; and a tuner 15, an encoder 16, a storage device 17, a decoder 18, a signal processing device 19, and an EPG acquisition device 20 all connected to the control device 11 via a bus 14.

The tuner 15 is compatible with analog terrestrial broadcasts, digital terrestrial broadcasts, analog satellite broadcasts, digital satellite broadcasts, and CATV transmissions. In operation, the tuner 15 acquires the TV broadcast signal of a desired channel from the output of an antenna, not shown. The tuner 15 outputs the acquired TV broadcast signal to the encoder 16 for recording or to the decoder 18 for real-time viewing. The tuner 15 also outputs the acquired TV broadcast signal to the EPG acquisition device 20.

The encoder 16 encodes the TV broadcast signal input from the tuner 15 according to a predetermined encoding standard (e.g., MPEG-2) and outputs the resulting encoded data to the storage device 17. If the TV broadcast signal coming from the tuner 15 is already encoded, the processing by the encoder 16 may be skipped. The storage device 17 is composed of a recording medium such as a hard disk or a DVD (digital versatile disc) and a corresponding drive. In operation, the storage device 17 records the encoded data coming from the encoder 16 to the recording medium or retrieves the data from the medium for output to the decoder 18.

During reproduction of a recorded program, the decoder 18 decodes the encoded data retrieved from the storage device 17 and outputs the resulting video and audio signals to the signal processing device 19. During real-time viewing, the decoder 18 decodes the TV broadcast signal if the signal turns out to be encoded when input from the tuner 15, and outputs the resulting video and audio signals to the signal processing device 19. The signal processing device 19 performs suitable signal processing on the video and audio signals coming from the decoder 18 and forwards the processed signals to the TV set 2 located downstream. The EPG acquisition device 20 extracts EPG data from the TV broadcast signal input from the tuner 15.

FIG. 3 is a block diagram of functional blocks implemented by the control device 11 carrying out suitable programs recorded on the recording medium 12. The functional blocks shown in FIG. 3 may be implemented individually by separate programs, or a plurality of functional blocks may be implemented using a single program. It is also possible to implement the functional blocks in FIG. 3 by use of hardware.

A software management block 31 manages the starting and ending of the programs representative of each of the functional blocks involved.

A viewing control block 32 functioning as part of the user interface handles the user's operations for tuning and reproduction, and causes relevant functional blocks to execute the processes of viewing, reproduction, and display of EPG listings. A recording reservation block 33 acting also as part of the user interface generates reservation information based on the user's operations for setting recording reservations by use of EPG listings and outputs the generated information to a recording reservation management block 36.

Under control of the viewing control block 32, a real-time viewing block 34 controls the tuner 15, decoder 18, and signal processing device 19 so as to let the user have a real-time viewing experience based on the received TV broadcast signal. A recorded program reproduction block 35 controls the storage device 17, decoder 18, and signal processing device 19 in such a manner as to reproduce recorded programs under control of the viewing control block 32.

The recording reservation management block 36 manages the reservation information coming from the recording reservation block 33. A similarity calculation block 37 included in the recording reservation management block 36 calculates degrees of similarity between the keyword written in recording reservation information on the one hand, and program names acquired from the program information constituting the EPG data on the other hand. A changing block 38 included in the recording reservation management block 36 updates the recording reservation information being managed by the latter. An EPG management block 39 manages the EPG data acquired by the EPG acquisition device 20.

A recording control block 40 controls the tuner 15, encoder 16, and storage device 17 so as to record programs based on the recording reservation information managed by the recording reservation management block 36. A recorded program management block 41 manages the encoded data constituting the recorded programs in the storage device 17.

FIG. 4 is a tabular view listing typical reservation information 100 generated by the recording reservation block 33. The reservation information 100 includes: reservation information ID 101 for uniquely identifying each item of reservation information; a track setting flag 102 specifying whether or not to change the reservation information of interest by tracking program names in EPG data; a recording starting date and time 103 indicating the date and time at which to start recording; a recording ending date and time 104 indicating the date and time at which to end recording; an ending time prolongation 105 denoting an extra recording time subsequent to the recording ending date and time; repeat recording information 106 designating repeat intervals; channel information 107 indicating the channel on which the program to be recorded is broadcast; a recording medium 108 specifying a target medium among a plurality of recording media that may be incorporated in the storage device 17; priority 109 denoting the degree of priority for this reserved program where a plurality of recording reservations overlap in the same time slot; a delete-upon-update flag 110 specifying whether or not to delete the previous recording upon execution of repeat recording; and a recording mode 111 indicating the picture quality of recording.

The reservation information 100 further includes: a reservation type 112 indicating whether this reservation information represents a program reservation with event ID tracking, a program reservation without event ID tracking, or a date and time-designated reservation; corresponding program information 113 indicating program information (to be discussed later with reference to FIG. 5) about the program corresponding to this reservation information; a program name tracking flag 114 indicating whether a program name tracking process has been performed; a program name tracking keyword 115 by which to track program names during the program name tracking process; and initially set reservation information 116 indicative of what was initially set as this reservation information.

The track setting flag 102 may be set either collectively for all programs reserved by reservation information, or individually for each of the programs reserved by reservation information.

The items of reservation information subsequent to the track setting flag 102 are established automatically on the basis of the user's operations for setting recording reservations using the EPG. Alternatively, the user may designate individual items of information as desired.

Under the reservation type 112, the program reservation with event ID tracking indicates that this reservation information has been set on a specific program and that the user has set this information to deal with future changes in broadcast times. The program reservation without event ID tracking also under the reservation type 112 indicates that this reservation information has been set on a particular program and that the user has set this information to ignore any future change in broadcast times or to accommodate beforehand the probable ending time prolongation. The date and time-designated reservation under the reservation type 112 indicates that this reservation information has been set not on any specific program but on a particular channel with a starting date and time and an ending date and time designated.

In the program name tracking keyword 115, the name of the program to be recorded is set by default. The default may be replaced with any other character string by the user as desired.

FIG. 5 lists typical program information extracted illustratively from EPG data. The program information 150 includes: a program information ID 151 constituting identification information specific to this program information; a starting date and time 152 indicating the date and time at which the corresponding program starts getting broadcast; an ending date and time 153 indicating the date and time at which the broadcast of the corresponding program ends; a program name 154 representing the title of the corresponding program; channel information 155 indicating the channel on which the corresponding program is broadcast; genre information 156 indicating the genre of the corresponding program; program detail information 157 showing detailed information about the corresponding program; extended program detail information 158 showing more detailed information about the corresponding program; an event ID 159 serving as information for uniquely identifying the corresponding program; an event relay execution flag 160 specifying whether or not the corresponding program when broadcast is to be relayed from one channel to another (i.e., whether or not a so-called event relay is to be carried out); event relay destination information 161 indicating the destination broadcast channel to be reached upon event relay execution, along with the event ID of the corresponding program; and other program information 162 such as shared event information, multi-view information, image quality, charging information, audience age information, series information, ES information, and copy control information.

The program information ID 151 is specific to this program information. Illustratively, if a change in the broadcast time of the corresponding program has prompted updates in the contents of the starting date and time 152 and ending date and time 153, then the program information ID of the program information is also modified.

The same event ID 159 will not be attached to different programs on the same broadcast channel. However, the same event ID may be attached to programs across different broadcast channels.

The program information 150 is distributed periodically regarding the programs to be broadcast in the future (in a few hours or in a few days). Also distributed are program information EIT[p] about the currently broadcast program and program information EIT[f] about the program to be broadcast next. The two items of program information EIT[p] and EIT[f] are updated at short intervals and distributed at breakpoints in the course of a program broadcast (e.g., at news bulletins inserted during a long-hour program) or upon sudden changes of broadcast times (e.g., at program prolongation or curtailment).

What follows is a description of how the video recorder 1 operates in connection with recording reservations.

Figure 6:
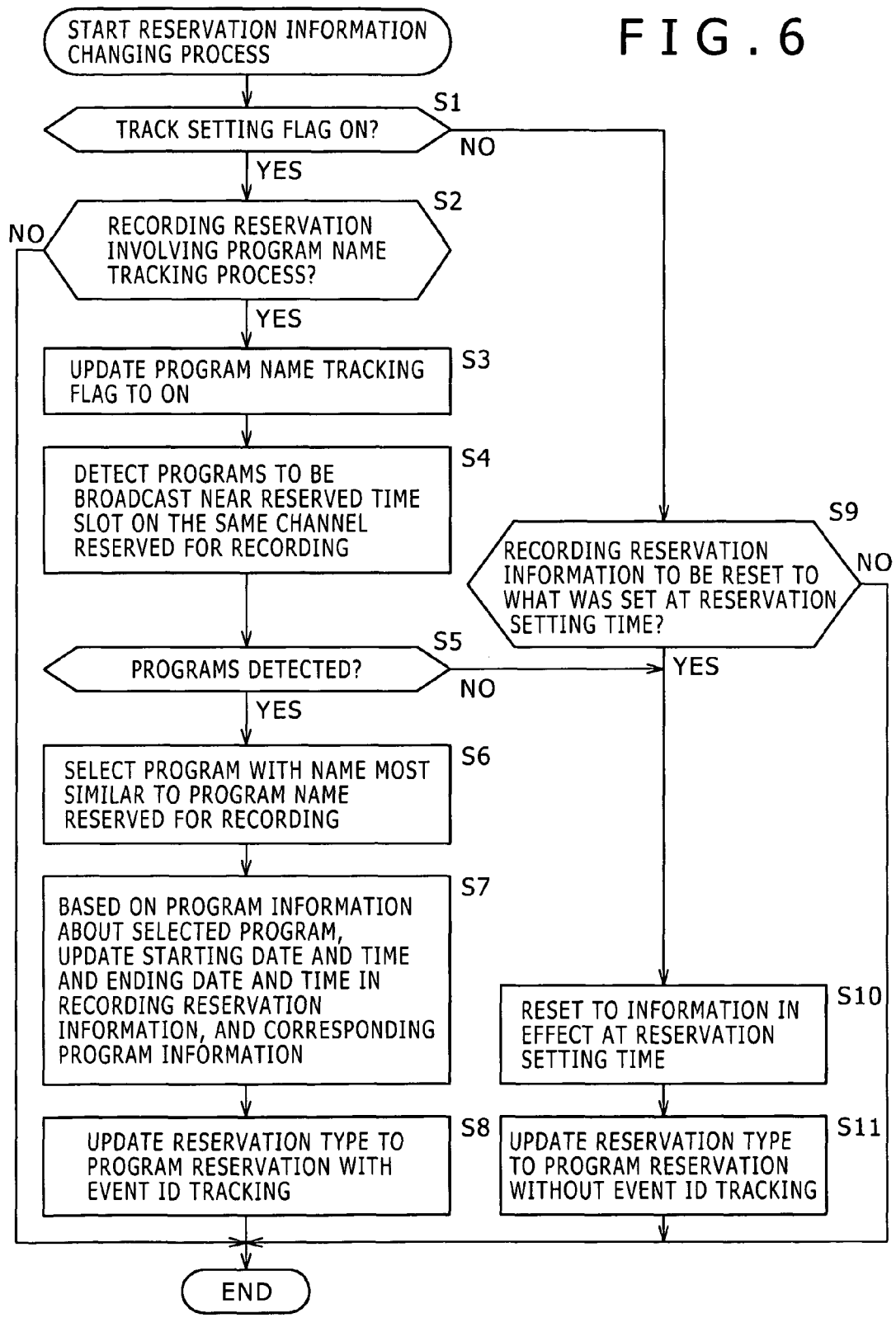
FIG. 6 is a flowchart of steps constituting a reservation information changing process.

First to be described with reference to FIG. 6 is the reservation information changing process whereby an established recording reservation is periodically reviewed and changed as needed. This process is carried out on relevant reservation information when a new recording reservation is added or when an existing recording reservation is changed. The reservation information changing process may also be performed periodically, e.g., once every day on all reservation information when program information is received.

In step S1 of FIG. 6, the recording reservation management block 36 checks to determine whether the track setting flag 102 is on for the reservation information 100 to be processed (called the target reservation information hereunder). If the track setting flag 102 is found on, step S2 is reached. In step S2, the recording reservation management block 36 checks to determine whether the target reservation information is one that involves a program name tracking process. The reservation information not to be associated with the program name tracking process is illustratively one in which the reservation type 112 is a program reservation with event ID tracking. When the reservation information not to be accompanied by the program name tracking process is excluded from the target reservation information, duplicate changes in the reservation information are prevented.

If in step S2 the target reservation information is found to be one that involves the program name tracking process, step S3 is reached. In step S3, the recording reservation management block 36 turns the program name tracking flag 114 on. If the target reservation information is found to be one that does not involve the program name tracking process, then the reservation information changing process on the target reservation information is terminated.

In step S4, the recording reservation management block 36 references the EPG data in the EPG management block 39 in order to detect the programs to be broadcast near the reserved time slot on the same channel on which the program corresponding to the target reservation information is broadcast. In step S5, the recording reservation management block 36 checks to determine whether relevant programs were detected in step S4. If such programs were found to be detected in step S4, step S6 is reached. If no program was detected in step S4, control is passed on to step S10 (to be discussed later).

In step S6, the similarity calculation block 37 in the recording reservation management block 36 selects the program whose title is the most similar to the keyword 115 in the target reservation information from among the programs detected in step S4. In step S7, the changing block 38 acquires the program information about the selected program from the EPG management block 39 and, based on the acquired program information, updates the starting date and time 103 and ending date and time 104 in the target reservation information, as well as the corresponding program information 113. In step S8, the changing block 38 updates the reservation type 112 to a program reservation with event ID tracking. The reservation information changing process on the target reservation information is then brought to an end.

If in step S1 the track setting flag 102 in the target reservation information turned out to be off, control is passed on to step S9. In step S9, the recording reservation management block 36 checks to determine whether the target reservation information should be reset to what was initially established at reservation setting time. The target reservation information to be reset is illustratively one in which the program name tracking flag is on. If it is found necessary to reset the target reservation information to what was initially established at reservation setting time, then control S10 is reached. In step S10, the changing block 38 resets the starting date and time 103 and ending date and time 104 to their initial values on the basis of the initially set reservation information 116. In step S11, the changing block 38 updates the reservation type 112 to a program reservation without event ID tracking. The reservation information changing process on the target reservation information is then terminated.

The foregoing description has been about the reservation information changing process. This process makes it possible to change reservation information in keeping with periodically acquired EPG data.

Figure 7:
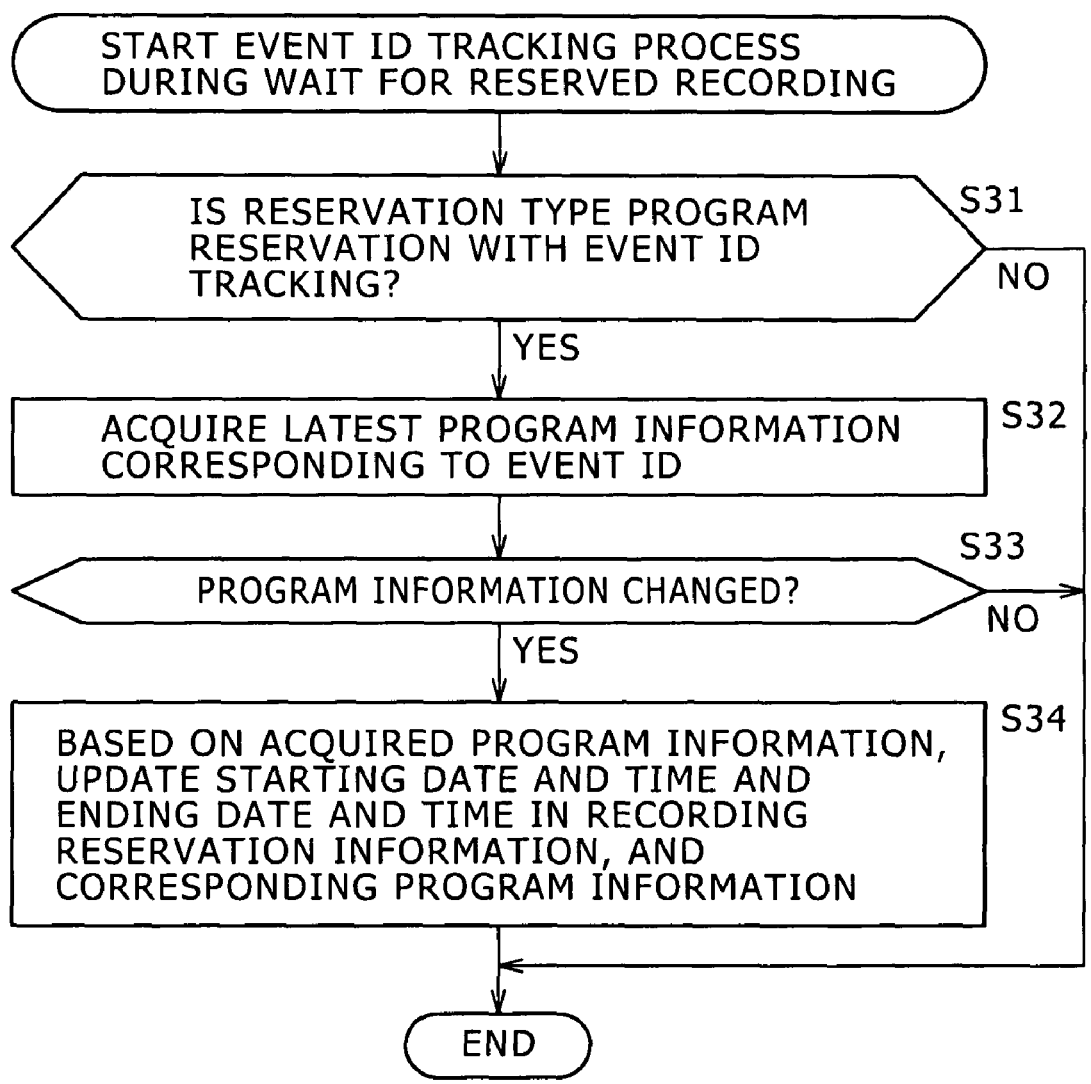
FIG. 7 is a flowchart of steps constituting an event ID tracking process performed during the wait for reserved recording.

Described below with reference to the flowchart of FIG. 7 is the event ID tracking process to be performed during the wait for reserved recording. This event ID tracking process is carried out repeatedly on the reservation information 100 (target reservation information) of which the recording starting date and time comes within a predetermined time period.

In step S31 of FIG. 7, the recording reservation management block 36 checks to determine whether the reservation type 112 in the target reservation information is a program reservation with event ID tracking. If the result of the check in step S31 is affirmative, step S32 is reached. In step S32, the recording reservation management block 36 acquires the channel information and event ID from the corresponding program information 113 in the target reservation information, and obtains from the EPG management block 39 the program information 150 corresponding to the retrieved channel information and event ID.

In step S33, the recording reservation management block 36 determine whether the program information ID in the corresponding program information 131 as part of the target reservation information matches the program information ID 151 in the program information 150 acquired in step S32, to see if the program information corresponding to the target reservation information is. changed. More specifically, if the two program information ID's are found to be different, the recording reservation management block 36 recognizes a change that occurred in the program information corresponding to the target reservation information.

If in step S33 the program information corresponding to the target reservation information is found to have changed, then step S34 is reached. In step S34, on the basis of the program information 150 acquired in step S32, the changing block 38 updates the starting date and time 103 and ending date and time 104 in the target reservation information, as well as the corresponding program information 113. The event ID tracking process on the target reservation information during the wait for reserved recording is then brought to an end.

If in step S31 the reservation type 112 is not found to be a program reservation with event ID tracking, or if in step S33 no change is found in the program information corresponding to the target reservation information, then the subsequent steps are skipped. At this point, the event ID tracking process on the target reservation information during the wait for reserved recording is terminated.

The foregoing description has been about the event ID tracking process during the wait for reserved recording. This process makes it possible correctly to record a particular program reserved for recording even if the broadcast time of the reserved program is shifted illustratively because of the prolongation of a baseball game broadcast earlier.

Figure 8:
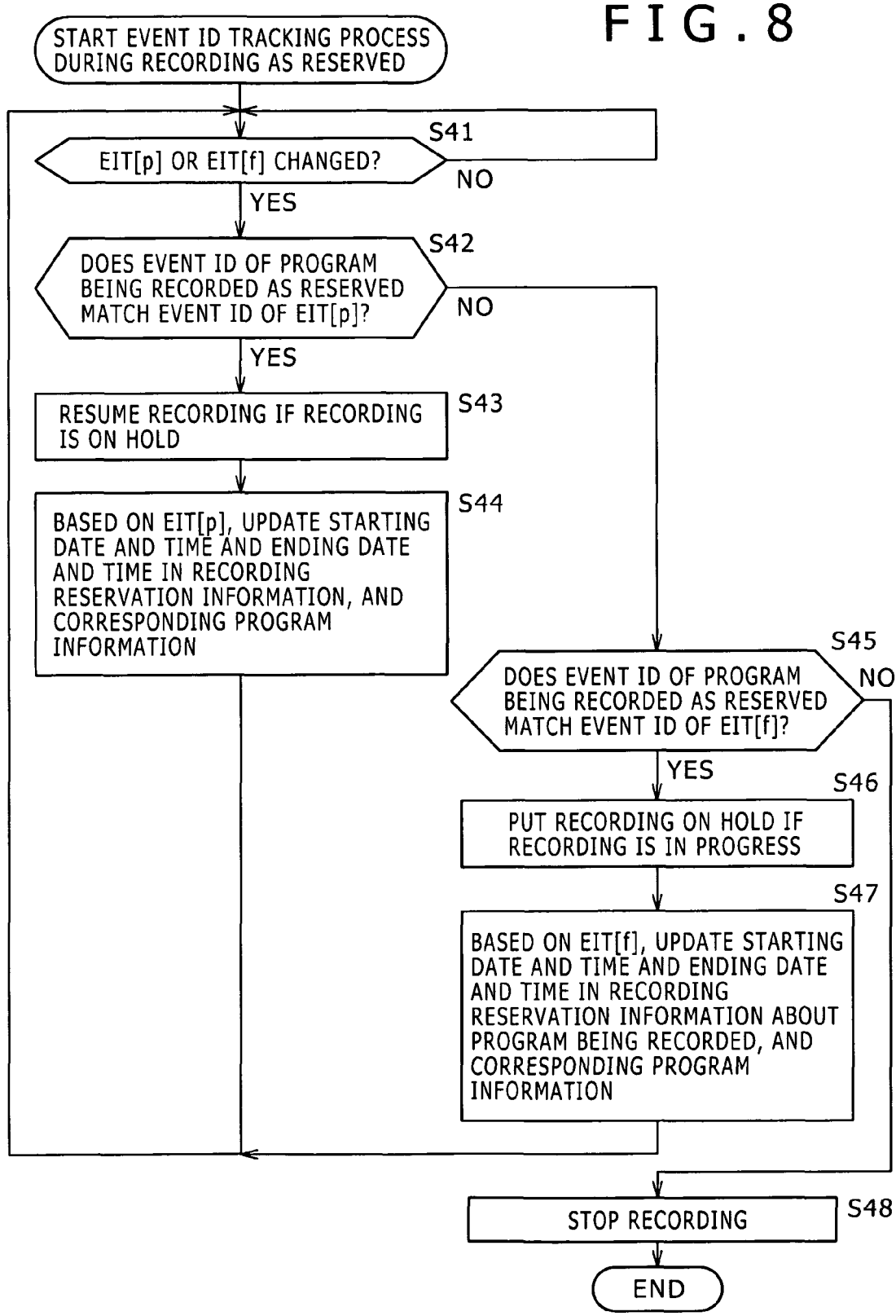
FIG. 8 is a flowchart of steps constituting an event ID tracking process during recording as reserved.

Described below with reference to the flowchart of FIG. 8 is the event ID tracking process to be performed during recording as reserved. This event ID tracking process is carried out repeatedly on the reservation information 100 (target reservation information) of which the recording starting date and time has already been reached so that recording of the reserved program is in progress.

In step S41 of FIG. 8, the recording reservation management block 36 acquires continuously the latest program information from the EPG management block 39 and checks to see if any change has occurred in the program information EIT[p] about the currently broadcast program or in the program information EIT[f] about the program to be broadcast next. If any change is detected in EIT[p] or in EIT[f], step S42 is reached. In step S42, the recording reservation management block 36 checks to determine whether the event ID of the program currently recorded according to the target reservation information matches the event ID described in EIT[p]. A match of the event ID detected in step S42 confirms that the program to be recorded is currently broadcast. In this case, step S43 is reached.

In step S43, the recording control block 40 checks to determine whether recording is currently put on hold. The recording operation is resumed if it is found to be on hold. If the recording is currently under way, it is allowed to continue. In step S44, on the basis of the latest EIT[p], the changing block 38 updates the starting date and time 103 and ending date and time 104 in the target reservation information, as well as the corresponding program information 113. This terminates the event ID tracking process on the target reservation information during recording as reserved.

If in step S42 a mismatch is detected between the event ID of the program currently recorded according to the target reservation information on the one hand, and the event ID described in EIT[p] on the other hand, that means the program to be recorded is not currently broadcast. In this case, step S45 is reached.

In step S45, the recording reservation management block 36 checks to determine whether the event ID of the program currently recorded according to the target reservation information matches the event ID described in EIT[f]. A match of the event ID detected in step S45 indicates that the target program to be recorded is not currently broadcast, that another program (e.g., news bulletin) is currently inserted, and that recording of the target program will be resumed following the currently inserted program. In this case, step S46 is reached.

In step S46, the recording control block 40 checks to determine whether recording is currently in progress. The recording operation is put on hold if it is currently under way. If the recording is currently on hold, it is allowed to remain in that state. In step S47, on the basis of the latest EIT[f], the changing block 38 updates the starting date and time 103 and ending date and time 104 in the target reservation information, as well as the corresponding program information 113. This brings to an end the event ID tracking process on the target reservation information during recording as reserved.

If in step S45 a mismatch is detected between the event ID of the program currently recorded according to the target reservation information on the one hand, and the event ID described in EIT[f] on the other hand, that means the recording of the target program has come to an end. In that case, step S48 is reached.

In step S48, the recording control block 40 terminates the recording operation. This brings to an end the event ID tracking process on the target reservation information during recording as reserved.

The foregoing description has been about the event ID tracking process carried out during recording as reserved. This process makes it possible to continue recording the target program if an earlier program such as a baseball game broadcast was extended beyond its scheduled ending time. The process also makes it possible to put the recording operation on hold if a different program (e.g., news bulletin) is inserted by interrupting a long-hour program (e.g., baseball game broadcast) and to resume the recording as soon as the interrupted target program broadcast is resumed.

Figure 9:
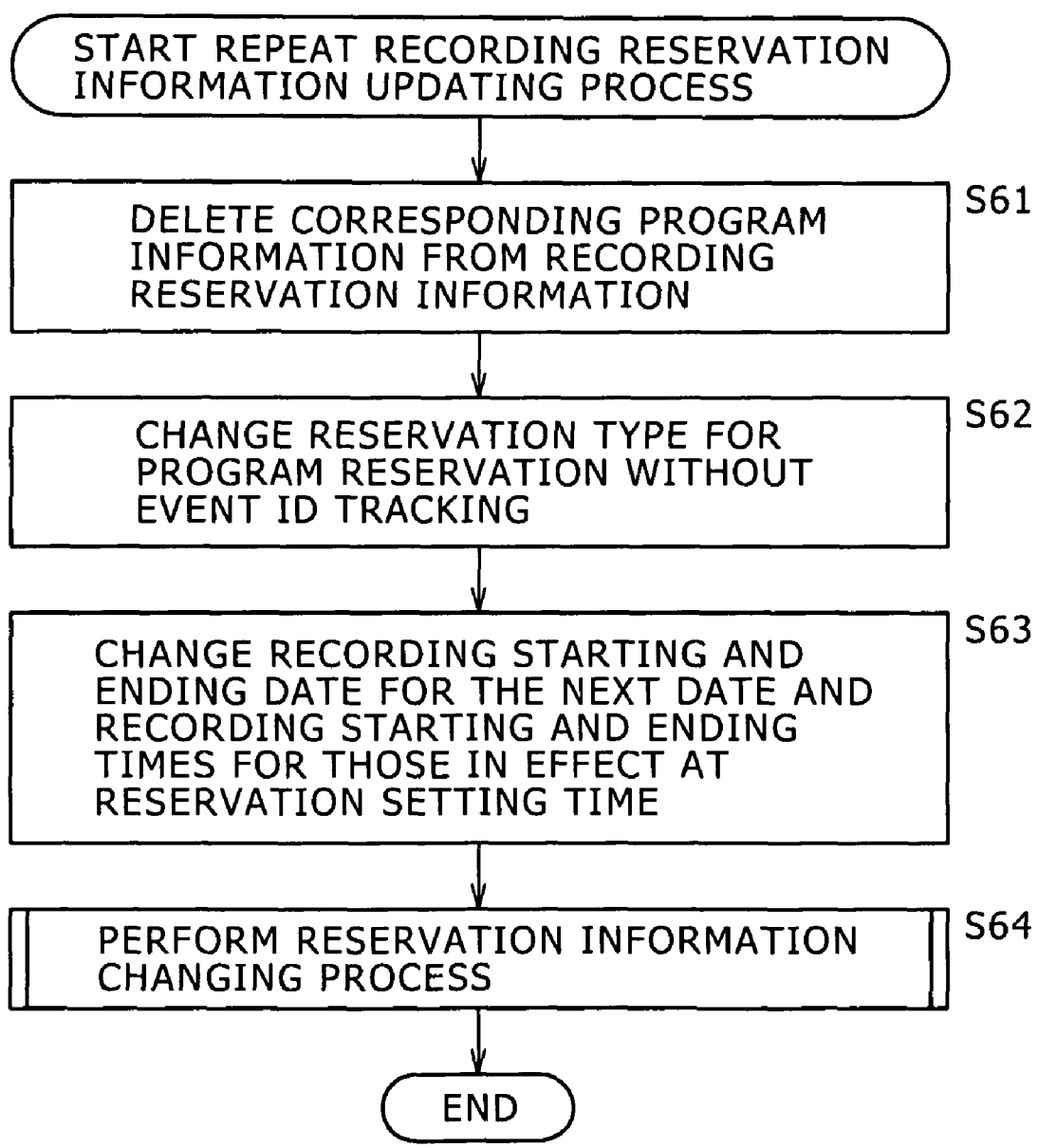
FIG. 9 is a flowchart of steps constituting a repeat recording reservation information updating process.

Described below with reference to the flowchart of FIG. 9 is the process of updating the reservation information corresponding to repeat recording reservations (i.e., repeat recording reservation information updating process). This process is carried out on those items of reservation information 100 in which is set the repeat recording information 106 for every day, every week, a particularly day of the week, etc., and of which the corresponding programs have already been recorded (the information will be called the target reservation information hereunder).

In step S61 of FIG. 9, the changing block 38 deletes the corresponding program information 113 from the target reservation information. In step S62, the changing block 38 changes the reservation type 112 in the target reservation information for a program reservation without event ID tracking. In step S63, the changing block 38 temporarily changes the starting date and time 103 and ending date and time 104 in the target reservation information for those of the next scheduled broadcast time.

In step S64, the reservation information changing process described above with reference to FIG. 6 is carried out on the target reservation information. This causes the target reservation information to be updated in a manner reflecting the next program broadcast reserved for repeat recording. The repeat recording reservation information updating process is then brought to an end.

The foregoing description has been about the repeat recording reservation information updating process.

According to an embodiment of the present invention, as described above, the reservation information changing process, the event ID tracking process during the wait for reserved recording, and the event ID tracking process during recording as reserved are carried out on all reservation information without distinction between one-shot and repeat recording reservations. This feature enhances convenience by automatically dealing with changes in program broadcast times with no need to distinguish between one-shot and repeat recording reservations.

When a different program is inserted into the target program, the recording of the target program is put on hold for the duration of the inserted program. This feature allows the recording medium to be used efficiently without wasting recording space on the intrusion in the case of an unscheduled interruption of the target program.

Prior to each repeat recording session, the inventive arrangements acquire the latest program information so as to update the reservation information in storage. This increase the amount of information about the repeatedly recorded programs, making it easier for the user to know what has been recorded.

In this specification, the steps carried out according to software programs represent not only the processes that are to be carried out in the depicted sequence (i.e., on a time series basis) but also processes that may be performed parallelly or individually and not chronologically.

The software programs may be processed either by a single computer or by a plurality of computers in distributed fashion. Furthermore, the software programs may be transferred to a remote computer or computers when carried out.

In this specification, the term "system" refers to an entire configuration made up of a plurality of component devices.

It should be understood by those skilled in the art that various modifications, combinations, sub-combinations and alterations may occur depending on design requirements and other factor in so far as they are within the scope of the appended claims or the equivalents thereof.

What is claimed is:

1. A recording apparatus for recording at least either a video or an audio signal of a program in accordance with reservation information, said recording apparatus comprising:
   an acquisition block configured to acquire program information about said program, wherein said program information includes a program information ID specific to said program information;
   a calculation block configured to calculate a degree of similarity between a program name included in said reservation information and the program name described in said program information acquired by said acquisition block;
   a changing block configured to change said reservation information using said program information about the program determined by said degree of similarity, said changing block further changing said reservation information based on the program information about the program corresponding to program identification information included in said reservation information;
   a recording reservation management block configured to determine whether program information ID in said program information as part of said reservation information matches said program information ID in said acquired program information; and
   a recording control block configured to record at least either the video or the audio signal of said program in accordance with said reservation wherein,
   while recording is in progress in accordance With said reservation information, said recording control block compares the program identification information included in said reservation information with the program identification information about the currently broadcast program, said recording control block further stopping temporarily, resuming, or terminating the ongoing recording depending on an outcome of the comparison,
   wherein when a different program having different program identification is inserted into the currently broadcast program, the recording of said program is put on hold for a duration of said different program.

2. The recording apparatus according to claim 1, wherein said changing block updates said reservation information at predetermined time intervals.

3. A recording method for use with a recording apparatus which records at least either a video or an audio signal of a program in accordance with reservation information, said recording method comprising the steps of:
   acquiring program information about Said program, said program information including a program information ID specific to said program information;
   calculating a degree of similarity between a program name included in said reservation information and the program name described in said program information acquired by said acquisition block;
   changing said reservation information using said program information about the program determined by said degree of similarity, said changing step further changing said reservation information based on the program information about the program corresponding to program identification information included in said reservation information;
   determining whether program information ID in said program information as part of said reservation information matches said program information ID in said acquired program information; and
   recording at least either the video or the audio signal of said program in accordance with said reservation information wherein,
   while recording is in progress in accordance with said reservation information, a recording control step compares the program identification information included in said reservation information with the program identification information about the currently broadcast program, said recording control step further stopping temporarily, resuming, or terminating the ongoing recording depending on an outcome of the comparison,
   wherein when a different program having different program identification is inserted into the currently broadcast program the recording of said program is put on hold for a duration of said different program.

4. A computer-readable program on a computer-redable non-transitory storage medium for causing a computer to carry out a recording method for recording at least either a video or an audio signal of a broadcast program in accordance with reservation information, said method comprising the steps of:
- acquiring program information about said program, said program information including a program information ID specific to said program information;
- calculating a degree of similarity between a program name included in said reservation information and the program name described in said program information acquired by said acquisition block;
- changing said reservation information using said program information about the program determined by said degree of similarity, said changing step further changing said reservation information based on the program information about the program corresponding to program identification information included in said reservation information;
- determining whether program information ID in said program information as part of said reservation information matches said program information ID in said acquired program information; and
- recording at least either the video, or the audio signal of said program in accordance with said reservation information wherein,
- while recording is in progress in accordance with said reservation information, a recording control step compares the program identification information included in said reservation information with the program identification information about the currently broadcast program, said recording control step further stopping temporarily, resuming, or terminating the ongoing recording depending on an outcome of the comparison,
- wherein when a different program having different program identification is inserted into the currently broadcast program, the recording of said program is put on hold for a duration of said different program.

* * * * *